United States Patent [19]
Zeitlin

[11] 3,724,881
[45] Apr. 3, 1973

[54] PRESSURE VESSEL WITH CONNECTOR FITTING

[76] Inventor: Alexander Zeitlin, 18 Macy Avenue, White Plains, N.Y. 10605

[22] Filed: Feb. 18, 1972

[21] Appl. No.: 227,471

[52] U.S. Cl. ........................52/192, 52/249, 285/158
[51] Int. Cl. ..........................E04h 7/02, F16l 41/00
[58] Field of Search..........52/249, 245, 221, 21, 192; 285/189, 192, 158, 64; 138/153; 249/160

[56] References Cited

UNITED STATES PATENTS

| | | | |
|---|---|---|---|
| 443,992 | 1/1891 | Hart | 52/21 |
| 485,808 | 11/1892 | Curtis et al. | 52/249 X |
| 1,208,983 | 12/1916 | Krebs | 52/245 |
| 1,430,094 | 9/1922 | Meier | 52/245 X |
| 1,435,542 | 11/1922 | Martin | 52/245 X |
| 2,028,968 | 1/1936 | Carlstrom | 52/249 |
| 3,433,382 | 3/1969 | Boggio | 138/153 X |
| 3,479,697 | 11/1969 | Kramarow | 249/160 X |

FOREIGN PATENTS OR APPLICATIONS 271,914    3/1964    Australia..............................52/245

Primary Examiner—Thomas F. Callaghan
Attorney—James H. Tilberry et al.

[57] ABSTRACT

A segmented high pressure vessel has a special connector fitting incorporated in its peripheral wall for connecting a pipe thereto.

10 Claims, 8 Drawing Figures

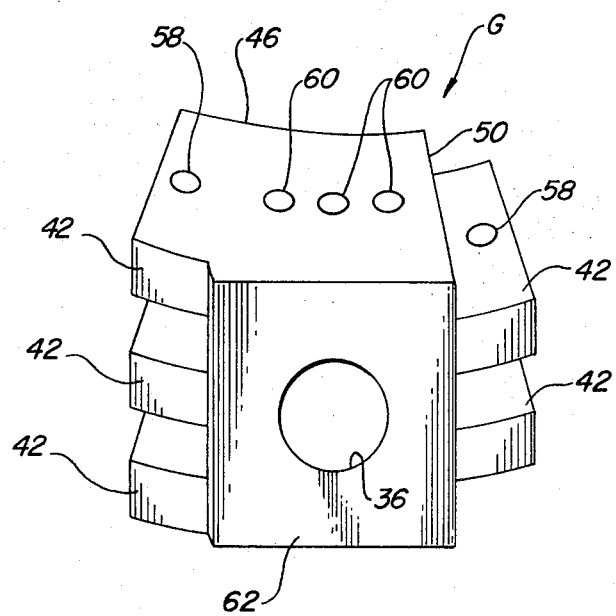

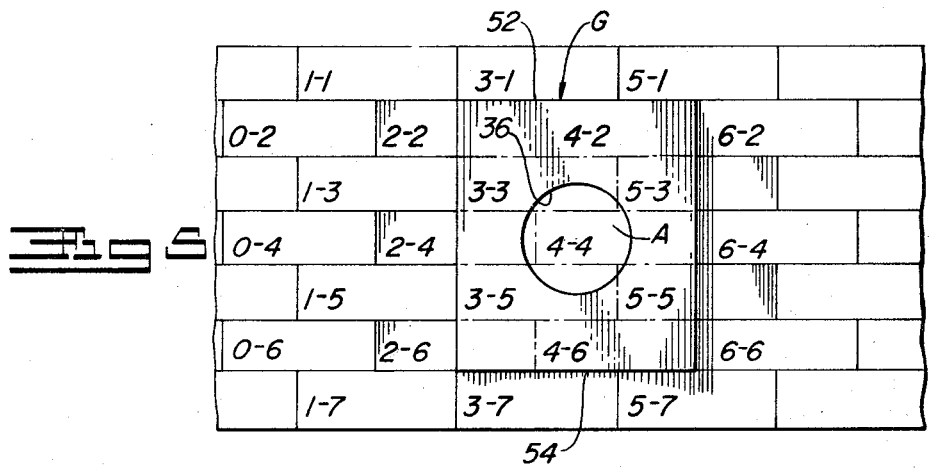
Fig. 5
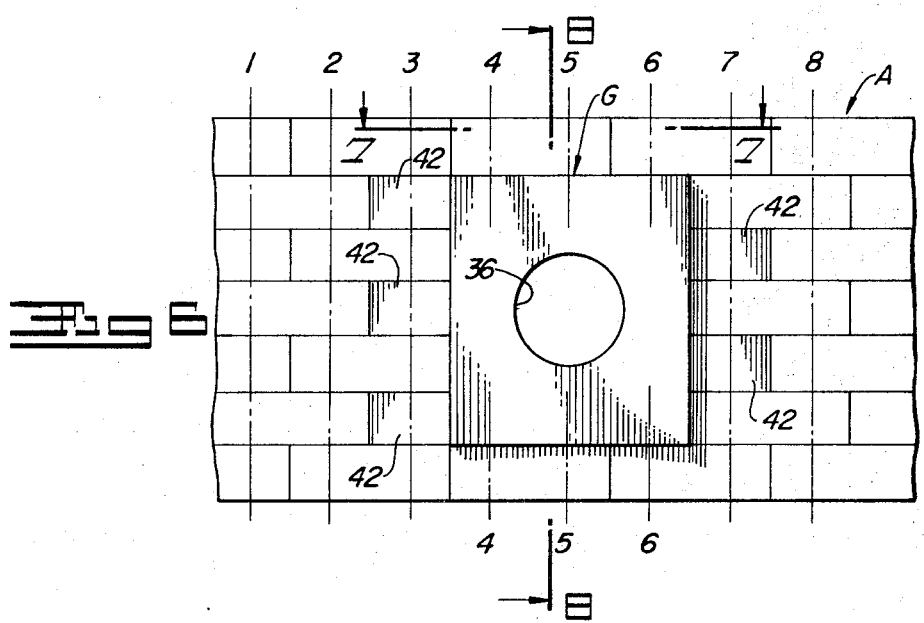
Fig. 6
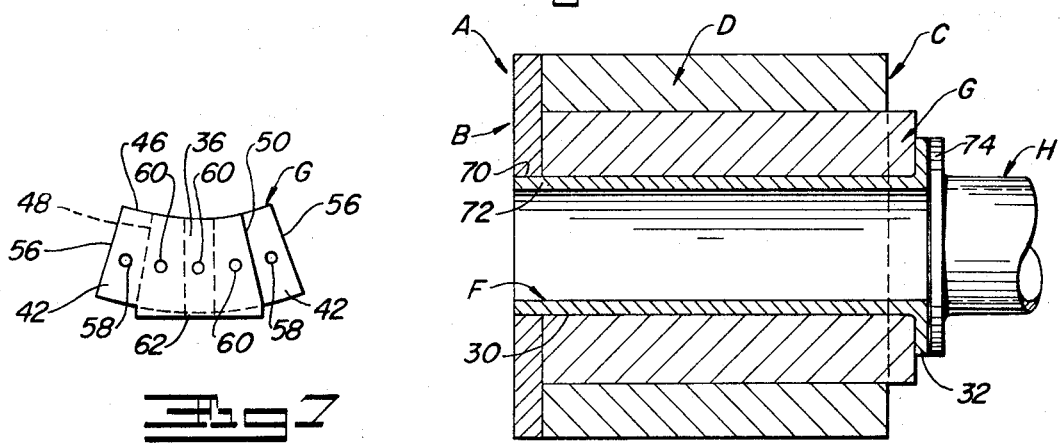
Fig. 7
Fig. 8

3,724,881

PRESSURE VESSEL WITH CONNECTOR FITTING

BACKGROUND OF THE INVENTION

This application pertains to the art of high pressure vessels and more particularly to a connector fitting for incorporation into the peripheral wall of such a vessel for connecting a pipe thereto. Although the invention is particularly applicable to use with segmented high pressure vessels, it will be appreciated that the invention has broader applications and may be used with other vessels.

High pressure vessels of a known type include an inner liner surrounded by a main support cylinder. The main support cylinder is formed from a plurality of vertically stacked ring layers and each ring layer includes a plurality of discrete arcuate ring sectors. Portions of each ring sector in each ring layer overlap portions of ring sectors in adjacent ring layers. All of the ring layers are connected by pins extending axially through the overlapping portions of the ring sectors.

A support cylinder of the type described is capable of withstanding very high hoop tension without Lam'e effect of stress in or near the internal peripheral wall thereof. High pressure vessels of this type are disclosed in U. S. Pat. Nos. 3,278,993 issued Oct. 18, 1966; 3,433,382 issued March 18, 1969; and 3,479,697 issued Nov. 25, 1969. Vessels of this type and their uses are also described in an article entitled "High Pressure Technology," in Scientific American, of May, 1965, pages 38 through 46, and in an article entitled "High Pressure Technology; Industrial Applications," in Mechanical Engineering, of December, 1965, pages 14 through 21. The disclosures of the aforementioned patents and articles are hereby incorporated herein by reference.

With high pressure vessels of the type described, it is extremely difficult to connect pipes to the vessel. Crossheads of a press in which such a vessel is positioned interfere with connections to the ends of the vessel. In addition, making such a connection to an end of the vessel which is to be opened requires disassembly of the connection when the vessel is opened. The ring sectors in such a vessel do not have a great enough thickness to accommodate a large diameter pipe connection. A desirable size of pipe usually has an internal diameter greater than the thickness of one ring sector. It is sometimes necessary to connect a plurality of small pipes to a plurality of individual ring sectors in order to obtain the desirable flow capacity.

It would be desirable to have an arrangement for making connection of large diameter pipes to the peripheral wall of such vessels.

SUMMARY OF THE INVENTION

A high pressure vessel of the type described has a special connector fitting incorporated into its peripheral wall for connecting a pipe to the vessel.

In accordance with a preferred arrangement, the connector fitting has a peripheral outline and shape identical with a plurality of ring sectors which it replaces in the peripheral wall of the vessel.

The connector fitting has a height which is substantially equal to a whole number multiple greater than one and substantially less than the total number of ring layers in the vessel times the thickness of one ring sector.

The connector fitting has a length substantially equal to a whole number multiple substantially less than the total number of ring sectors in one ring layer times one-half the length of one ring sector.

The connector fitting has a centrally located opening therethrough and opposite side edges with projection means extending outwardly therefrom. The projection means project outwardly from the side edges a distance substantially equal to one-half the length of one ring sector.

The connector fitting and projection means have bores formed therein for receiving pins to connect the connector fitting with adjacent ring sectors in adjacent ring layers.

It is a principal object of the present invention to provide an improved arrangement for connecting a pipe to a segmented high pressure vessel.

It is also an object of the present invention to provide a connector fitting for easy incorporation into the peripheral wall of a segmented vessel.

BRIEF DESCRIPTION OF THE DRAWING

The invention may take form in certain parts and arrangements of parts, a preferred embodiment of which will be described in detail in this specification and illustrated in the accompanying drawing which forms a part hereof.

FIG. 3 is a view similar to FIG. 2 and showing a plurality of segments removed from the peripheral wall;

FIG. 4 is a perspective illustration showing the connector fitting of the present invention;

FIG. 5 is a view similar to FIGS. 2 & 3 and showing the improved connector fitting of the present invention incorporated into the peripheral wall of the vessel of FIG. 1;

FIG. 6 is a view similar to FIG. 3 and showing an arrangement of pins for connecting the connector fitting of the present invention in the peripheral wall of the vessel of FIG. 1;

FIG. 7 is a cross-sectional plan view looking generally in the direction of arrows 7—7 of FIG. 4–6; and FIG. 8 is a cross-sectional elevational view looking generally in the direction of arrows 8-8 of FIG. 4–6 and showing a pipe connected with the connector fitting.

DESCRIPTION OF THE PREFERRED EMBODIMENT

Figure 1:
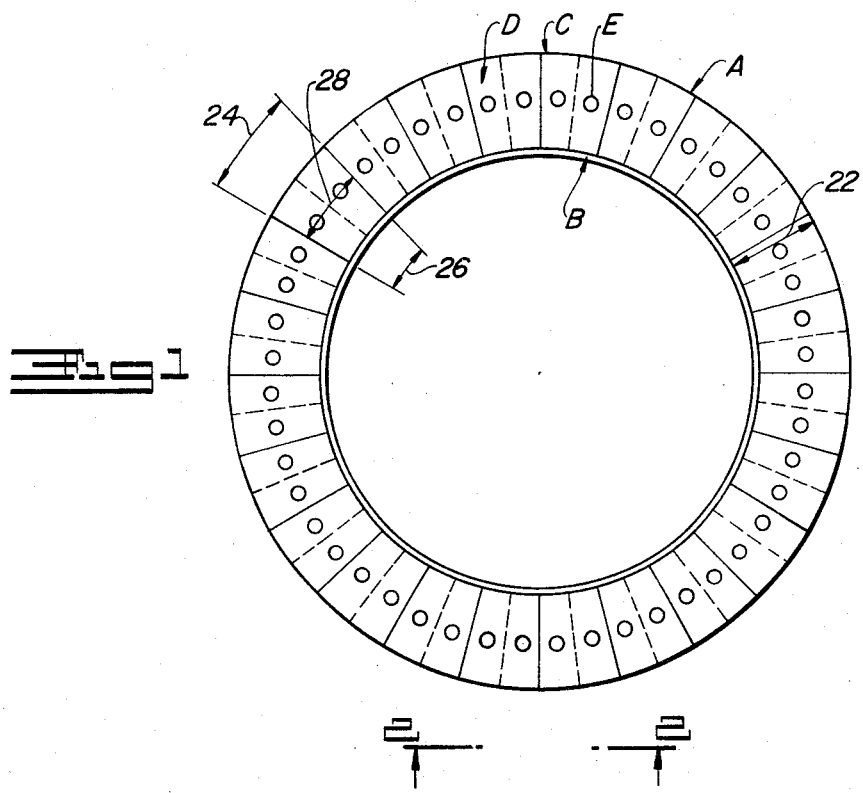
FIG. 1 is an end elevational view of a segmented high pressure vessel with which the connector fitting of the present invention is used.

Referring now to the drawings, wherein the showings are for purposes of illustrating a preferred embodiment of the invention only and not for purposes of limiting same, FIG. 1 shows a segmented brick-layer type of high pressure vessel A. Vessel A includes an inner cylindrical liner B surrounded by a plurality of vertically stacked cylindrical ring layers C. Each ring C is formed from a plurality of arcuate ring secotrs D. In alternate ring layers c, arcuate segments D are staggered with respect to ring sectors D in adjacent ring layers C. This provides overlapping portions on each ring sector which overlap ring sectors in adjacent ring layers.

Suitable axial bores are formed through the ring sectors for receiving pins E to interconnect all of the ring layers and ring sectors.

It will be recognized that the dimensions of the pressure vessel form no part of the present invention and various sizes of vessels and ring sectors may be used. An example of dimensions will be given simply for purposes of illustration and should not be taken in a limiting sense. Liner B may have an internal diameter of 30 feet and a wall thickness of 6 inches. The outer diameter is thus 31 feet. Each ring layer C has 24 arcuate segments D therein. Each arcuate segment D has a width dimension 22 of 78 inches and a thickness dimension measured axially of vessel A of 12 inches. The outer peripheral surface of each ring sector D extends over an arc 24 determined by dividing 24 into the quantity pi times 44. Each ring sector D has an inner peripheral arcuate length 26 determined by dividing 24 into the quantity pi times 31. Each ring sector D has an average arcuate length 28 determined by dividing 24 into the quantity pi times 37.5. It is again to be emphasized that the dimensions given are only for purposes of example and the improvement of the present invention may be used with vessels of various dimensions, and with varying numbers of ring sectors and ring sector dimensions.

Figure 2:
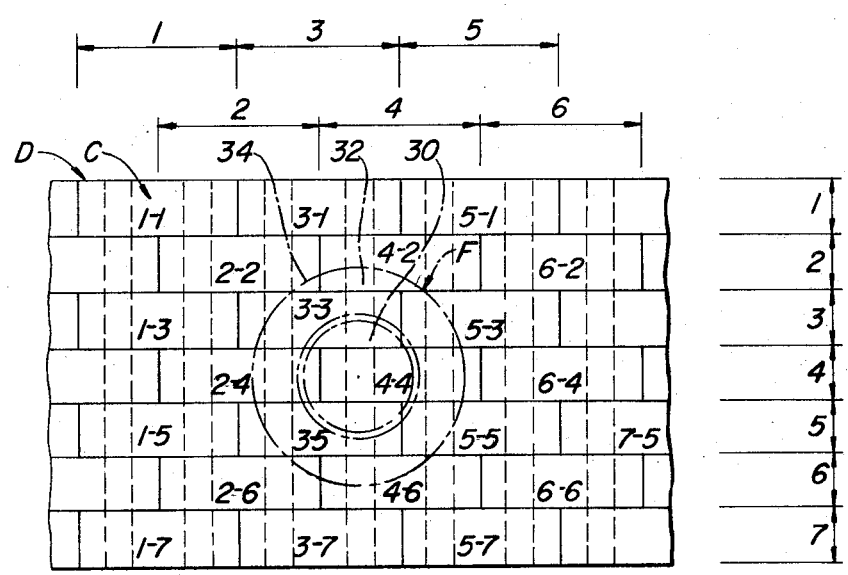
FIG. 2 is a partial side elevational view looking generally in the direction of arrows 2—2 of FIG. 1.

As shown in FIG. 2, ring sectors D in alternating ring layers C are vertically aligned. For simplicity of expalantion, these vertically aligned columns of ring sectors D in alternating ring layers C have been numbered 1 through 6 to identify 6 vertical columns of ring sectors. It will be recognized that there are actually 48 such vertical columns in the vessel described although there may be a greater of lesser number for vessels of different dimensions. Each vertically stacked ring layer C has also been numbered with numbers 1 through 7 on the right hand side of FIG. 2. It will be recognized that there may actually be a much larger number of ring layers in the vessel. Each ring sector D in FIG. 2 has been identified with a first number indicating the vertical column in which that sector lies, and with a second number after a dash following the first number identifying the ring layer in which that sector lies.

For a vessel as described, it is often desirable to connect a pipe F to the peripheral wall thereof. Pipe F has an internal diameter 30 of around 24 inches and a connecting flange 32 whose outer periphery 34 has a diameter of around 48 inches. It is not possible to connect such a large pipe to the peripheral wall of vessel A because internal diameter 30 spans more than one ring layer C. This makes it impossible to bore a hole through the peripheral wall of vessel A and still have all of the ring sectors interconnected by pins.

In the arrangement described, it will be recognized that the projection of pipe flange 32 covers a portion of at least 10 ring sectors D as follows: 2—2, 2—4, 2—6, 3—3, 3—5, 4-2, 4—4, 4-6, 5—3, and 5—5. In accordance with the present invention, these 10 ring sectors D are removed from the peripheral wall of vessel A and incorporated into a one-piece unitary connector fitting G. That is, connector fitting G is a forging having a peripheral outline and dimension the same as the previously described 10 ring sectors. For simplicity of explanation, ring sectors D which are replaced by connector fitting G are shown in dotted lines on connector fitting G in FIG. 5. Connector fitting G has a centrally located opening 36 therethrough for establishing communication between pipe F and the interior of vessel A.

Forces which originally existed between the original replaced segments will be canceled out by their replacement with a one-piece fitting G. These canceled forces are between the following original segments: 2—2 and 3—3; 3—3 and 4—2; 4—2 amd 5—3; 2—4 and 3—3; 3—3 and 4—4; 4—4 and 5—3; 2—4 and 3—5; 3—5 and 4—4; 4—4 and 5—5; 2—6 and 3—5; and 4—6; and 4—6 and 5—5.

Forces between remaining ring sector and fitting G remain in effect. These forces may be identified with reference to the dotted line showing of the previous ring sectors on fitting F in FIG. 3—5. Connecting forces are provided as follows: 1—1 and 2—2; 3—1 and 2—2 and 4—2; 5—1 and 4—2; 6—2 and 5—3; 1—3 and 2—2 and 2—4; 6—4 and 5—3 and 5—5; 1—5 and 2—4 and 2—6; 6—6 and 5—5; 1—7 and 2—6; 3—7 and 2—6 and 4—6; and 5—7 and 4—6.

FIG. 6 shows connector fitting G incorporated into the peripheral wall of vessel A. Pins E of FIG. 1 are represented by centerlines in FIG. 6. The pins for connecting ring sectors in adjacent layers are the same as before and simply extend through holes in the overlapping portion of adjacent ring sectors D. Pins 3 and 7 may also extend completely through all of ring layer C by passing through bores in projections 42 on connector fitting G. Pins 4, 5 and 6 are desirably shorter and simply extend into bores in the body of fitting G. These bores in the body of fitting G preferably have a depth at least as great as the thickness of one segment D so that pins 4, 5 and 6 penetrate into connector fitting G a distance at least as greatas the thickness of one ring sector D. Thus, pins 4, 5 and 6 are duplicated above and below connector fitting G. It may be possible in some cases to make pins 4 and 6 extend the complete length of vessel A but it is perferable that a bore through which such pins pass does not come too close to opening 36 in fitting G. Pins 1, 2, 3, 7 & 8 are in shear between each ring layer. Pins 4, 5 & 6 are in shear only between fitting G and the adjacent ring layer, and between the ring layers they extend through, if more than one.

As shown in FIGS. 4, 6 & 7, connector fitting G has an arcuate inner surface 46 which lies on the surface of a cylinder and is curved in a direction between opposite side edges 48 and 50 of fitting G. Opposite side edges of fitting G lie on radius lines of a circle or cylinder to abut against adjacent ring sectors D. Fitting G also has opposite substantially parallel end edges 52 and 54. Projection means 42 extend outwardly from side edges 48 and 50 a distance substantially equal to one-half the length of one arcuate sector D and are correspondingly arcuately curved. Projection means 42 have inner surfaces forming a continuation of inner surface 46 of connector G. Projection means 42 include side edges 56 which also lie on radius lines of a circle or cylinder for abutment with adjacent ends of ring sectors D in the peripheral wall of vessel A. Holes 58 are formed through projection means 42 for receiving pins 3 and 7. Bores 60 in the body of fitting G are for receiving pins 4, 5 and 6 as previously described. Connector fitting G has a substantially plane and flat outer surface 62 for ease in connecting flange 32 of pipe F thereto.

In the preferred arrangement, connector fitting G is arcuately curved in the same manner as ring sectors D. Connector fitting G has an arcuate length which is equal to a whole number multiple substantially less than the total number of ring sectors D in one ring layer C times one-half the length of one of ring sectors D. Preferably, such arcuate length of connector fitting G, as measured between opposite side edges 48 and 50, is not greater then three times one-half the length of one ring sector D. Connector fitting G has a height which is substantially equal to a whole number multiple greater than one but less than the total number of ring layers C in vessel A times the thickness of one ring sector D. Projection means 42 each has a thickness substantially equal to the thickness of one ring sector D. In the arrangement shown, three projections 42 are provided extending outwardly from side edge 48 of connector G. These projections are vertically spaced-apart a distance equal to the thickness of one ring sector D. Two projections 42 are provided extending outwardly from side edge 50 of connector G and these are vertically spaced-apart a distance equal to the thickness of one ring sector D. Projections 42 extending outwardly from side edge 50 are also spaced from opposite end edges 52 and 54 a distance equal to the thickness of one ring sector D. Connector fitting G is preferably incorporated into the peripheral wall of vessel A intermediate the opposite ends thereof so that ring layers C are located adjacent both opposite ends 52 and 54.

FIG. 8 shows pipe F extending through opening 30 in connector fitting G. Liner B has a hole 70 therethrough of substantially the same size and aligned with opening 30 in fitting G. Pipe F has a tubular portion 72 whose outer diameter is substantially the same as the diameter of opening 30 and extends therethrough. Flange 32 may be bolted to flat outer surface 62 of fitting G. Other arrangements may also be provided for securing pipe F to fitting G. Another pipe H of the same size as pipe F has a connecting flange 74 which may be connected to flange 32 on pipe F.

The improved arrangement of the present invention does not increase shear stresses on the cross-sections of the connecting pins by incorporating fitting G into the peripheral wall of vessel A. These stresses remain the same as in the conventional brick-layer pattern of segmented vessel without any fitting G incorporated therein.

Although the invention has been shown and described with reference to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. In a segmented high pressure vessel including a plurality of vertically-stacked circular ring layers, each of said ring layers including a plurality of discrete arcuate ring sectors, portions of each of said ring sectors in each of said ring layers overlapping portions of ring sectors in adjacent ring layers, all of said ring layers being connected by pins extending axially through said overlapping portions of said ring sectors, the improvement comprising; a unitary fitting built into said vessel for connecting conduit means thereto, said fitting having a substantially central opening therethrough for establishing communication between said vessel and an outer conduit connectable with said fitting, said fitting having a height substantially equal to a whole number multiple greater than one and less than the total number of said ring layers times the thickness of one of said ring sectors, said fitting having a length substantially equal to a whole number multiple substantially less than the total number of said ring sectors in one of said ring layers times one-half the length of one of said ring sectors, said fitting having opposite side edges, projection means projecting outwardly from each of said side edges, said projection means having a length substantially equal to one-half the length of one of said ring sectors and a thickness substantially equal to the thickness of one of said ring sectors, and axially extending pin means connecting said fitting and projection means to adjacent ring sectors in adjacent ring layers.

2. The device of claim 1 wherein said fitting has a flat outer surface.

3. The device of claim 1 wherein said projection means comprises plural projections on at least one of said side edges vertically-spaced a distance substantially equal to the thickness of one of said ring sectors.

4. The device of claim 3 wherein said whole number multiple for determining said length of said fitting is not greater than three.

5. The device of claim 4 wherein said vessel includes opposite ends and said fitting is positioned intermediate said ends.

6. The device of claim 1 wherein said whole number multiple for determining said length of said fitting is not greater than three.

7. The device of claim 1 wherein said vessel includes opposite ends and said fitting is positioned intermediate said ends.

8. The device of claim 1 wherein said fitting has an outer surface and further including a conduit received in said opening in said fitting, said conduit having a coupling flange thereon positioned adjacent said outer surface of said fitting.

9. A connector fitting for use with a segmented high pressure vessel of the type including a peripheral wall formed from a plurality of vertically-stacked circular ring layers, each of said ring layers including a plurality of discrete arcuate ring sectors, portions said ring sectors in each of said ring layers overlapping portions of ring sectors in adjacent ring layers, all of said ring layers being connected by pins extending axially through said overlapping portions of said ring sectors, said fitting being incorporatable into said peripheral wall in replacement for a plurality of said ring sectors, said fitting having opposite side edges and opposite end edges and an arcuate inner surface curved between said side edges and lying on the periphery of a cylinder, said side edges lying on radius lines of a cylinder, said fitting having a height substantially equal to a whole number multiple greater than one and less than the total number of said ring layers times the thickness of one of said ring sectors, said fitting having a length substantially equal to a whole number multiple substantially less than the total number of said ring sectors in one of said ring layers times one-half the length of one of said ring sectors, said fitting having a substantially central opening therethrough, projection means projecting outwardly from each of said side edges a distance substantially equal to one-half the length of one of said ring sectors, said projection means having a thickness substantially equal to the thickness of one of said ring sectors and curved inner surfaces forming a continuation of said arcuate inner surface of said fitting, said projection means having outer edges lying on radius lines of a cylinder, and said fitting and projection means having bores therein for receiving pins to connect said fitting and projection means to ring sectors in said peripheral wall of said vessel.

10. The fitting of claim 9 wherein said fitting has a flat outer surface.

* * * * *